March 7, 1967  YASUNOSUKE TORII  3,308,369
VOLTAGE REGULATING DEVICE
Filed April 27, 1964  3 Sheets-Sheet 1

FIG. 3

| Notch | Tap Switch | | | | | | ----- | | | | Selector Switch | | | |
|---|---|---|---|---|---|---|---|---|---|---|---|---|---|---|
| | S1 | S2 | S3 | S4 | S5 | S6 | | S10 | S11 | S12 | K1 | K2 | K3 | K4 |
| 1o | O | | | | | | | | | | | | O | |
| 1p | O | | | | | | | | | | | | O | |
| 1 | O | | | | | | | | | | O | | O | |
| 2o | O | O | | | | | | | | | O | | | O |
| 2p | O | O | | | | | | | | | O | | | O |
| 2 | O | O | | | | | | | | | O | O | | O |
| 3o | | O | O | | | | | | | | | O | O | |
| 3p | | O | O | | | | | | | | | O | O | |
| 3 | | O | O | | | | | | | | O | O | O | |
| 4o | | | O | O | | | | | | | O | | | O |
| 4p | | | O | O | | | | | | | O | | | O |
| 4 | | | O | O | | | | | | | O | O | | O |
| 5o | | | | O | O | | | | | | | O | O | |
| 5p | | | | O | O | | | | | | | O | O | |
| 5 | | | | O | O | | | | | | O | O | O | |
| 6o | | | | | O | O | | | | | O | | | O |
| 6p | | | | | O | O | | | | | O | | | O |
| 6 | | | | | O | O | | | | | O | O | | O |
| ⋮ | | | | | | | | | | | | | | |
| 11o | | | | | | | | O | O | | | O | O | |
| 11p | | | | | | | | O | O | | | O | O | |
| 11 | | | | | | | | O | O | | O | O | O | |
| 12o | | | | | | | | | O | O | O | | | O |
| 12p | | | | | | | | | O | O | O | | | O |
| 12 | | | | | | | | | O | O | O | O | | O |

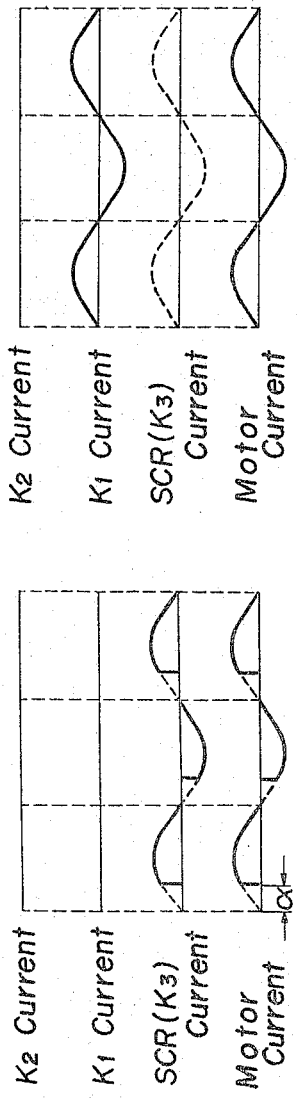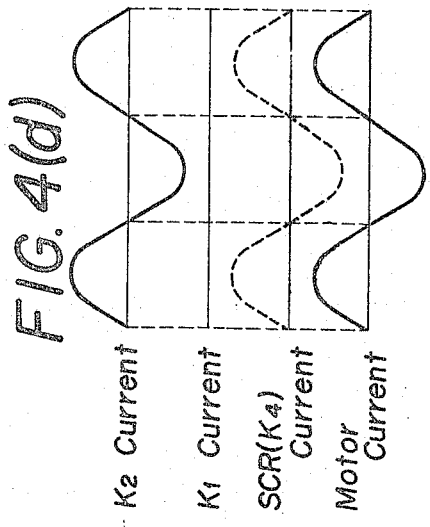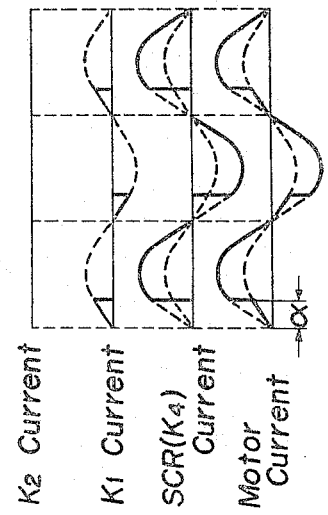

United States Patent Office 3,308,369
Patented Mar. 7, 1967

3,308,369
VOLTAGE REGULATING DEVICE
Yasunosuke Torii, Musashino-shi, Japan, assignor to Tokyo Shibaura Electric Co., Ltd., Kawasaki-shi, Japan, a corporation of Japan
Filed Apr. 27, 1964, Ser. No. 362,585
Claims priority, application Japan, Apr. 30, 1963, 38/22.872
5 Claims. (Cl. 321—16)

This invention relates to an improved voltage regulating device utilizing a tap changer, and more particularly to a voltage regulating device by means of an arcless tap changer utilizing semiconductor controlled rectifier elements.

The voltage regulating device of this invention is especially suitable for loads which require D.C. voltage varying substantially linearly from zero volt to the rated voltage. Among these there are D.C. motors, especially D.C. motors for driving electric cars. Although not limited to this particular application, the invention will be described hereunder with reference to a control device of electric cars.

In A.C. electric cars, including locomotives and trains, the trolley wire is energized by high voltage alternating current and the D.C. driving motors of the car are supplied with variable voltage direct current from the trolley wire through a tap changing transformer and a rectifier device. To control the speed of driving motors, a tap changer is operated to change voltage regulating taps of the transformer so as to vary D.C. voltage supplied to the driving motors. As a result, the tap changer is generally operated very frequently to cause severe wear of its operating parts, and therefore in maintaining and inspecting control devices for electric cars, most of the care must be directed to the tap changer, especially to its contacts. As is well known in the art when a tap changer is used the output D.C. voltage varies stepwisely so that it is difficult to provide linearly varying D.C. voltage. Moreover it is required to provide current limiting reactor or resistor in order to limit the short circuit current flowing between adjacent taps which are short circuited upon tap changing without interrupting the load current. In order to provide arcless tap changing it has been proposed to substitute semiconductor controlled rectifier elements such as silicon controlled rectifier elements (SCR) for mechanical contacts of the tap changer. Use of silicon controlled rectifier elements eliminates the necessity of utilizing mechanical moving parts and hence greatly simplifies the construction of the tap changer. However, in prior tap changer arrangement it is necessary to use relatively large number of controlled rectifier elements, which are relatively expensive.

Accordingly it is an object of this invention to provide an improved voltage regulating device by means of a tap changing arrangement.

Further object of this invention is to decrease the number of controlled rectifier elements required to effect tap changing.

Still further object of this invention is to provide an improved voltage regulating device which can change taps of a transformer without the necessity of providing any current limiting device to limit the short circuit current between taps.

Further object of this invention is to provide an improved voltage regulating device wherein the phase control device is so arranged as to control the conduction phase angle of the controlled rectifier elements to vary linearly the direct current voltage supplied to a load and is interlocked with the tap changer to ensure safe and positive tap changing operation.

Another object of this invention is to provide a voltage regulating device which can effect safe and positive tap changing operation even when any one of the rectifier elements fails to prevent forward current.

Still another object of this invention is to provide a voltage regulating device wherein load current can be easily transferred from controlled rectifier elements to conventional or non-controlled rectifier elements.

Briefly stated, to fulfill these and other objects, in accordance with one embodiment of this invention a main transformer having a plurality of voltage regulating taps are provided and alternate taps are connected to a first pair of conductors through respective tap switches. One of the terminals of a first pair of tap selector switches with the other terminals interconnected is connected to one end of the respective conductors of the pair, and to the common junction between said other terminals are connected in parallel a number of controlled rectifier elements. One of the terminals of a second pair of tap selector switches is connected to the other end of each of said pair of conductors whereas the other terminals of the second pair of selector switches are connected to conventional or non-controlled half wave rectifier elements which are connected in parallel opposition, said controlled and non-controlled rectifier elements being connected to a second pair of conductors such that elements having the same polarity are connected in parallel. A rectifier bridge including four half wave rectifier elements is provided and one of its A.C. input terminals is connected to the second pair of conductors in such a manner that the bridge rectifier elements and the controlled rectifier elements will have the same polarity. The other of said A.C. input terminals is connected to one terminal of a winding of the main transformer having voltage regulating taps and one or more of D.C. series motors comprising a load are connected across the D.C. output terminals of said rectifier bridge. The control circuit for controlling the conduction phase angle of the controlled rectifier elements is connected to be energized from another winding of the main transformers.

With the arrangement thus far described the driving motor of an electric car is firstly connected to the lowerest voltage tape of the main transformer through one of the selector switches of the first pair and appropriate controlled rectifier elements and the car is started and accelerated by controlling the conduction phase angle thereof. Upon completion of the phase control of the controlled rectifier elements they are rendered non-conductive and after the motor current has been transferred to one of the selector switches of the second pair which is connected to the same voltage regulating tap the first selector switch is opened under arcless condition. The motor is then connected to the second voltage regulating tap through the other selector switch and silicon controlled rectifier elements so as to further accelerate the electric car by controlling the conduction phase of the controlled rectifier elements. Upon completion of the phase control of the controlled rectifier elements the motor current flowing through one of the tap selector switches of the second pair is wholly transferred to the other selector switch of the first pair whereby permitting to open said tap selector switch of the first pair under arcless condition. Then the other selector switch of the second pair connected to the second tap is closed. Thus when the controlled rectifier elements are rendered non-conductive the motor current which has been flowed through the other selector switch of the first group will be wholly transferred to the other selector switch of the second pair connected to the same voltage regulating tap. These cycles of operations are repeated for the remaining taps until the motor is supplied with the maximum D.C. voltage.

While the specification concludes with claims particularly pointing out and distinctly claiming the subject matter which I regard as my invention, it is believed that the invention will be better understood from the following description taken in connection with the accompanying drawings.

In the drawings:

FIG. 3 illustrates a sequence diagram of various switches shown in FIG. 1 and

FIGS. 4a, 4b, 4c and 4d show plots of current waves to explain the operation of this invention.

Figure 1:
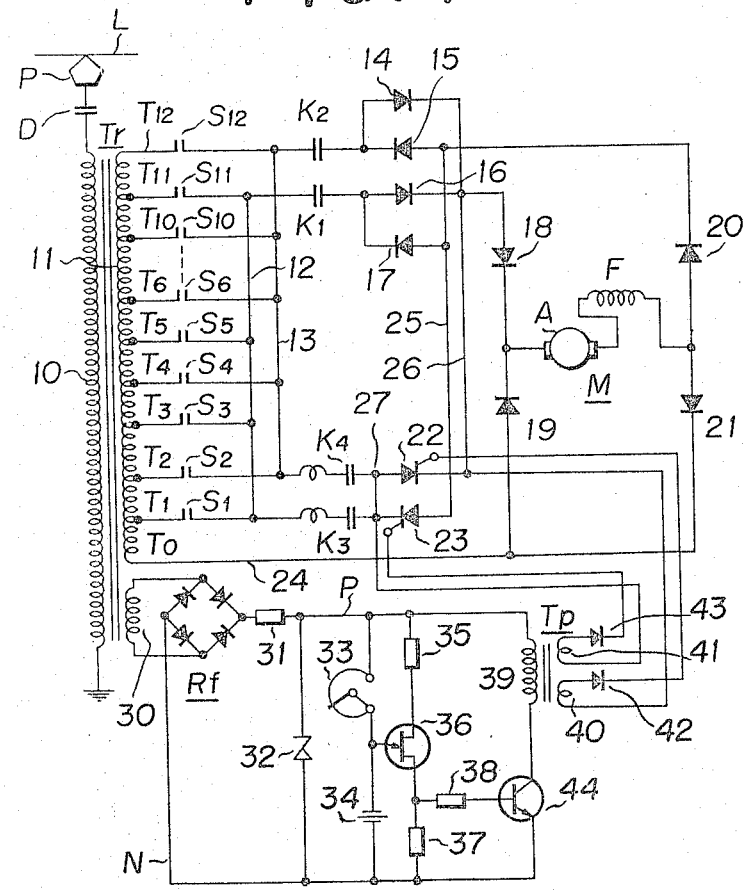
FIG. 1 shows a connection diagram of one example of the voltage regulating device embodying the principle of this invention.

Referring now to the accompanying drawing, one preferred embodiment of this invention will be described. For the sake of brevity, the main controller, protective device and the like which are usually used in the control device for electric cars are omitted. Although only one motor M for driving the electric car is shown it is of course to be understood that any suitable number of motors may be used and that they may be connected in series or in parallel. Although only one non-controlled rectifier and only one controlled rectifier element such as a silicon controlled rectifier element are shown for each requisite position in the respective circuits, appropriate number of these rectifier elements which are connected in series or in parallel may be used dependent upon the voltage and current ratings of the load.

A main transformer $T_r$ comprises a primary winding 10, a secondary winding 11 and a tertiary winding 30, one end of the primary winding 10 being connected to an overhead trolley wire L through a pantograph P and a disconnecting switch D and the other end grounded. The secondary winding 11 of the main transformer has two end terminals $T_0$ and $T_{12}$ and a plurality of intermediate voltage regulating taps $T_1$ to $T_{11}$ inclusive. The end terminal $T_{12}$ and the intermediate taps $T_1$ to $T_{11}$ inclusive are respectively connected to one side of tap switches $S_1$ to $S_{12}$ inclusive. Opposite terminals of odd numbered tap switches are connected to a conductor 12 while the terminals of the even numbered switches to a conductor 13. To the conductor 12 are connected to a tap selector switch $K_1$ and another tap selector switch $K_3$ provided with an arc extinguishing device and capable of interrupting the load current, and the conductor 13 is connected to a tap selector switch $K_2$ and a tap selector switch $K_4$, the latter having load current interrupting ability. As shown in the drawing the right hand terminals of the switches $K_3$ and $K_4$ are connected together at a point 27. The tap switches $S_1$ to $S_{12}$ inclusive and tap selector switches $K_1$ to $K_4$ inclusive comprise a tap changer. The common junction 27 between selector switches $K_3$ and $K_4$ is connected to the anode and cathode electrodes respectively of controlled rectifier elements 22 and 23 and the cathode and anode electrodes thereof are respectively connected to conductors 26 and 25. The right hand terminal of the switch $K_1$ is connected to the anode and cathode electrodes respectively of non-controlled rectifier elements 16 and 17 and the cathode and anode electrodes thereof are respectively connected to conductors 26 and 25. Similarly the right hand terminal of the switch $K_2$ is connected to conductors 26 and 25 through non-controlled rectifier elements 14 and 15 which are poled oppositely. Four non-controlled rectifier elements 18 through 21 are connected to form a rectifier bridge, one of its A.C. input terminals being connected to the lower terminal $T_0$ of the secondary winding 11 of the main transformer 10 by way of a conductor 24. The anode electrode of the rectifier element 18 is connected to the conductor 26 whereas the cathode electrode of the rectifier element 20 to the conductor 25. Across the D.C. output terminals of the rectifier bridge is connected an electric car driving motor M having an armature A and a series field winding F.

Having completed the description regarding the main circuit, the construction of a gate control circuit of the controlled rectifier elements 22 and 23 will be considered hereinbelow.

As shown in the drawing A.C. input terminals of a rectifier bridge $R_f$ comprising four half wave rectifiers are connected across the tertiary winding 30 of the main transformer $T_r$. A conductor P is connected to the positive side of the D.C. output terminal of the rectifier bridge $R_f$ through a suitable resistor 31 while another conductor N to the negative side to provide a full wave rectified voltage which is synchronized with the trolley voltage across conductors P and N. A Zener diode 32 and a series circuit including a variable resistor 33 which is interlocked with the tap changer to vary its resistance to control the conduction phase angle $\alpha$ of controlled rectifier elements 22 and 23 and a condenser 34 are connected across conductors P and N. Also another series circuit including a resistor 35, a unijunction transistor 36 and a resistor 37 is connected across conductors P and N, the emitter electrode of the unijunction transistor 36 being connected to a common junction between the variable resistor 33 and the capacitor 34. On the other hand the common junction between the first base electrode of the unijunction transistor 36 and the resistor 37 is connected to the base electrode of an NPN transistor 44 through a resistor 38. The emitter electrode of the transistor 44 is directly connected to the conductor N while the collector electrode to the conductor P through the primary winding 39 of a pulse transformer $T_p$. Each of the secondary windings of the pulse transformer $T_p$ is connected across the gate and cathode electrodes of controlled rectifier elements 22 and 23 respectively through half wave rectifiers 42 and 43 so as to control the conduction phase angle $\alpha$ of these controlled rectifier elements.

The manner in which the voltage applied to the electric car driving motor M is varied linearly from zero by the novel voltage regulating device shown in FIG. 1 to start and accelerate the electric car will now be considered by referring to a sequence table shown in FIG. 3 and various curves shown in FIG. 4.

It is well known in the art when a D.C. motor rotates a counter electromotive force proportional to the number of revolution is induced in its armature winding. As a result the armature current will be a continuous direct current only when the applied D.C. voltage is a substantially flat voltage containing but little pulsating voltage. However since the output voltage from the voltage regulating device shown in FIG. 1 is a full wave rectified voltage, it will be clear that the armature current can flow only during periods wherein the full wave rectified voltage is larger than the counter electromotive force induced so that the armature current is not a continuous current but instead an interrupted current. Actually as the armature A and the series field winding F have certain inductance, the relation between the applied voltage and the armature current is more complicated, but for the sake of simplicity, it is assumed herein that the motor M does not induce counter electromotive force and the above mentioned inductance is not present since these factors are not immaterial to the invention.

Referring to the sequence table shown in FIG. 3, after a master controller, not shown, has been operated to the first notch $1_0$ to close the tap switch $S_1$ and the selector switch $K_3$, the disconnecting switch D will be closed. Then the driving motor M will be connected to the first tap $T_0$ of the main transformer through the controlled rectifier elements 22 and 23 and the rectifier bridge but at this time no current flows through the motor because the controlled rectifier elements are maintained in their non-conductive state. When the master controller is advanced to a notch $1_p$ to rotate the slidable arm of the variable resistor 33 in the clockwise direction to decrease its resistance from the maximum value, the pulse transformer $T_p$ will generate ignition pulses of the phase to render conductive the controlled rectifier elements at the maximum phase angle in a manner to be described later in more detail. Thus the motor M will be started with the minimum voltage of the first tap $T_0$. By gradually varying the resistance o fthe variable resistor 33 with interlocked relation with the tap changer the conduction phase angle $\alpha$ of the controlled rectifier elements 22 and 23 will be varied from 180° to 0° (electric angle) to increase the voltage applied to the motor M from zero to full voltage of the first tap $T_0$. Thus the motor can be started very gradually and can be accelerated at a constant rate. Above relation is indicated by FIG. 4a. More particularly, selector switches $K_1$ and $K_2$ carry no current and controlled rectifier elements 22 and 23 conduct at a conduction phase angle $\alpha$ to supply current to the motor at a period from angle $\alpha$ to 180° through the tap switch $S_1$ and the selector switch $K_3$. When the conduction phase angle $\alpha$ of the controlled rectifier elements 22 and 23 is reduced to zero to render them fully conductive, thus finishing the phase control of these controlled rectifier elements at the first tap, the master controller will be advanced to the notch 1 to close the selector switch $K_1$. Thereafter the resistance of the variable resistor 33 is increased to its maximum value to stop generation of the ignition pulses for controlled rectifier elements 22 and 23 to render them non-conductive. This condition is shown in FIG. 4b. Thus since the selector switch $K_1$ is closed, the motor current will be transferred to the non-controlled rectifier elements from controlled rectifier elements 22 and 23 and the circuit is arranged to then stop generation of the ignition pulses. As a result the controlled rectifier elements will become non-conductive during the half cycles in which negative half cycles of the source voltage is applied to their anode electrodes, thus transferring all of the motor current to the rectifiers 16 and 17 to supply it to the motor through the tap switch $S_1$ and the selector switch $K_1$. In this way the electric car is accelerated to the maximum speed corresponding to the full voltage of the first tap $T_1$.

To further accelerate the electric car the master controller will be advanced to the notch $2_0$ to close the tap switch $S_2$ and the selector switch $K_4$ and to open the selector switch $K_3$. As above mentioned, at this stage since the controlled rectifier elements 22 and 23 are in their non-conductive state so that all of the motor current is passing through the selector switch $K_1$ the switches $S_2$ and $K_4$ can be closed and the switch $K_3$ closed respectively at no current condition. Thereafter master controller will be advanced to the notch $2_p$ to gradually decrease the resistance of the variable resistor 33 in a manner similar to that described above in connection with the notch $1_p$, whereby to cause the pulse transformer $T_p$ to generate an ignition pulse whose phase is gradually advanced to advance the conduction phase angle of the controlled rectifier elements 22 and 23. Thus the voltage applied to the motor M is linearly increased to further accelerate linearly the electric car. The above operation will be described in more detail by referring to FIG. 4c. Since the critical conduction phase angle of the controlled rectifier elements 22 and 23 is equal to $\alpha$ electrical degrees these rectifier elements will not conduct during the interval from zero to $\alpha$ degrees Since the tap switch $S_1$ and the selector switch $K_1$ are both in their closed position the motor current will flow through these switches $S_1$ and $K_1$ during the period from zero to $\alpha$ degrees of the source voltage. At the critical phase angle $\alpha$ of the source voltage the controlled rectifier elements 22 and 23 will become conductive which are now being connected to the second tap $T_2$ of the main transformer $T_r$ through the tap switch $S_2$ and the selector switch $K_2$, thus transferring the motor current from the first tap $T_1$ to the second tap $T_2$ at higher voltage. If it is assumed that the conduction phase angles $\alpha$ is equal to zero, all of the motor current will be supplied from the second tap $T_2$ thereby to further accelerate the electric car. After the master controller is advanced to the notch 2 to open the selector switch $K_2$, silicon controlled rectifier elements 22 and 23 are rendered non-conductive. This relation is shown in FIG. 4d. Thus in a manner similar to that described in connection with the notch 1, upon closure of the switch $K_2$, the motor current which has been flowing through the silicon controlled rectifier elements 22 and 23 will be transferred to the rectifier 14 and 15. Thus, it is now possible to render non-conductive silicon controlled rectifier elements 22 and 23 to supply the motor current from the second tap $T_2$ via the tap switch $S_2$ and the selector switch $K_2$. Thus the electric car will be accelerated to the maximum voltage corresponding to the full voltage at the second tap $T_2$.

To further accelerate the electric car the master controller will be advanced to the notch $3_0$ to open the tap switch $S_1$ and the selector switches $K_1$ and $K_4$ and close the tap switch $S_3$ and the selector switch $K_3$ respectively at no current condition. Like the procedure to that described above in connection with the notch $2_p$, the conduction phase angle $\alpha$ of the controlled rectifier elements 22 and 23 is advanced from 180° to zero degree to again increase linearly the voltage impressed upon the motor to linearly accelerate the electric car.

Thereafter similar operations are repeated according to the sequence table shown in FIG. 3 until a notch 12 is reached at which time the driving motor M will be supplied with full voltage to accelerate the electric car to its maximum speed, thus completing voltage regulation or the acceleration control during powering operation of the car.

In order to decelerate and stop the car the master controller is operated in the reverse direction, in which case the notches are reversed from the notch 12 to $1_0$ according to the sequence table shown in FIG 3. Since various operations at various notches during notch reversal are similar to those described in connection with notch advance, descriptions regarding them are believed unnecessary.

Operation of the gate control circuit will be described hereunder by referring to FIG. 1. It is to be remembered that a full wave rectified voltage which is synchronous with the source voltage is supplied across conductors P and N by means of the rectifier bridge $R_f$. By the action of the Zener diode 32 this full wave rectified voltage will be shaped into a trapezoidal wave having a constant magnitude as determined by the Zener voltage. As mentioned hereinbefore the slidable arm of the variable resistor 33 is interlocked with the tap changer to be rotated in the clockwise direction at each of the notches $1_p$, $2_p$, $3_p$ ... $12_p$. It is to be understood that the slidable arm is rotated to complete one revolution at each of these notches to vary its resistance from maximum to minimum. This variable resistor 33 constitutes an integration circuit together with the series condenser 34. Upon application of a constant potential across the series circuit the voltage across the condenser 34 will build at a rate determined by the CR time constant of the circuit. When the terminal voltage across the condenser 34 reaches the trigger point, the unijunction transistor 36 will become conductive to cause a current to flow through the resistor 35, the unijunction transistor 36 and the resistor 37 and also to cause the condenser 34 to discharge through the emitter-first base path of the unijunction transistor 36 and the resistor 37. The resulting positive potential appearing at the upper terminal of the resistor 37 will be impressed upon the base electrode of an NPN transistor 44 to render it conductive. This will energize the primary winding 39 of the pulse transformer $T_p$ to produce pulses in the secondary winding 40 and 41. As the condenser 34 discharges to decrease its terminal voltage the unijunction transistor 36 will be rendered non-conductive when the terminal voltage is decreased below a predetermined value resulting in the deenergization of the transistor 44 and the pulse transformer $T_p$. Pulses of opposite polarity induced at this time are checked by the rectifiers 42 and 43.

In this way gate control pulses for the controlled rectifier elements 22 and 23 are produced to control their conduction phase angle. Thus by varying the resistance of the variable resistor 33 from maximum to minimum in accordance with the operation of the tap changer the conduction phase angle of the controlled rectifier elements 22 and 23 can be controlled continuously. Moreover as the variable resistor 33 is controlled in interlocked relation with the tap changer, the sequence thereof is accurately followed at each notch position thus ensuring safe and accurate voltage control.

As will be clear from the foregoing description the present invention provides an economic voltage regulating device utilizing the minimum number of controlled rectifier elements. Although only one rectifier element has been used in FIG. 1 for each of the rectifier elements 22 and 23, generally a plurality of rectifier elements are connected in parallel corresponding to the capacity of a load. In accordance with this invention, however, since the controlled rectifier elements carry load current only for a short time required for effecting voltage regulation, these elements are not required to have large capacities commensurate with those of the loads but only sufficient to have far smaller capacities. Also the controlled rectifier elements are required to have relatively small reverse breakdown voltage which is comparable with the voltage between adjacent taps of the main transformer. As a result the number of controlled rectifier elements which are connected in series or parallel is far smaller when compared with the voltage and current ratings of the load. Also no particular means is required to limit the short circuiting current flowing between taps since the controlled rectifier elements as well as the non-controlled rectifier elements themselves act to prevent the short circuiting current.

According to the arrangement of this, a voltage regulating device can be provided that effects tap changing operation safely and accurately, even when the controlling ability of a controlled rectifier element is lost so that it can only act a simple rectifier element. As previously mentioned while the tap selector switches $K_3$ and $K_4$ connected in series with the controlled rectifier elements 22 and 23 have load interrupting ability, that of the controlled rectifier elements ensures voltage regulating operations of selector switches $K_3$ and $K_4$ under no load condition. Basically while the slector switches $K_3$ and $K_4$ may be those having no load current interrupting ability, should any one of the controlled rectifier elements fails to interrupt the load current, selector switches $K_3$ and $K_4$ must interrupt it. When the selector switches $K_3$ and $K_4$ are unable to interrupt the load current in such a case there is a danger that to burn out the contacts of these switches which may cause serious damage to the other apparatus in the system. Utilization of selector switches $K_3$ and $K_4$ having load interrupting capacity, however, provides a novel voltage regulating device which can effect safe and accurate tap changing operation should any one of the control rectifier elements 22 and 23 fails.

Figure 2:
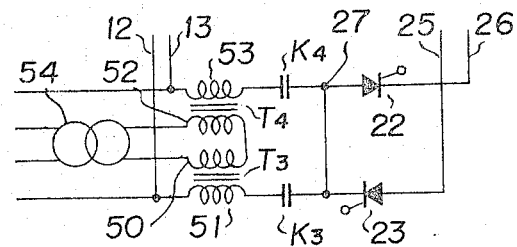
FIG. 2 shows a connection diagram of a portion of a modification of this invention.

FIG. 2 illustrates another embodiment of this invention which is constructed such that the load current flowing through silicon controlled rectifier elements can be easily transferred to conventional non-controlled rectifier elements without relying upon the current interrupting ability of the former upon completion of phase control thereof. Thus, according to this modification even in a case where the controlled rectifier element may lose its controlling ability selector switches $K_3$ and $K_4$ having no current interrupting ability may be used in series therewith.

As mentioned before, in accordance with this invention when the phase control of the controlled rectifier elements is over, the selector switch $K_1$ and $K_2$ is closed but about one half of the load current that has been supplied through it will be transferred to the controlled rectifier elements concurrently with the closure of the selector switch. Accordingly in the arrangement shown in FIG. 1 it is impossible to close the selector switch $K_1$ or $K_2$ under no current condition but can do so by the modification shown in FIG. 2.

To attain the object mentioned above in the modification shown in FIG. 2, wherein like reference characters are used to designate corresponding parts as in FIG. 1, secondary windings 51 and 52 of booster transformers $T_3$ and $T_4$ are respectively connected in series with the tap selector switches $K_3$ and $K_4$, each having no current interrupting ability. The primary windings 50 and 52 are connected in series between the terminal $t_0$ and the first tap $T_1$ of the main transformer $T_r$ through a phase shifter 54. The voltage induced in the secondary windings 51 and 55 of the booster transformers can be regulated so as to be in phase or out of phase with respect to the voltage in the secondary winding 11 of the main transformer $T_r$ by the manipulation of the phase shifter 54. As a result the voltage appearing at the common junction between tap selector switches $K_3$ and $K_4$ will be increased when the voltage of the secondary winding 11 of the main transformer $T_r$ and that of the secondary windings 51 and 53 are in phase, whereas will be decreased when they are out of phase.

The modification shown in FIG. 2 operates as follows:

In operation the phase shifter 54 is adjusted in interlocked relation with the tap changer (FIG. 1) so as to make the voltage of the common junction 27 to be slightly higher than the voltage of a tap to which the selector switch $K_3$ or $K_4$ is connected. This adjustment does not cause any trouble since rise in the voltage of the common junction 27 is small. Under this condition conduction phase angle $\alpha$ of the controlled rectifier elements 22 and 23 is controlled and upon completion thereof the tap selector switch $K_1$ or $K_2$ will be closed. Due to the fact that the potential of the common junction between selector switches $K_3$ and $K_4$ is higher than the potential of the tap to which switches $K_3$ or $K_4$ and $K_1$ or $K_2$ are connected it is able to open the switch $K_1$ or $K_2$ under no current condition. After closing the switch $K_1$ or $K_2$ under no current condition the phase shifter 54 is operated in interlocked relation with the tap changer to reverse the phase of the exciting current of the primary windings 50 and 52 of booster transformers $T_3$ and $T_4$ so as to reverse the phase of the voltage induced in their secondary windings 51 and 53. Thus the potential of the common junction 27 will be lowered with respect to the voltage of a tap to which switches $K_3$ or $K_4$ and $K_1$ or $K_2$ are connected thereby transferring all of the load current to the switch $K_1$ or $K_2$.

By the arrangement shown in FIG. 2 wherein booster transformers $T_3$ and $T_4$ associated with a phase shifter 54 are connected between selector switches $K_3$ and $K_4$ and conductors 12 and 13, respectively, and wherein the phase of the exciting current of the booster transformers $T_3$ and $T_4$ is controlled by the phase shifter 54 in interlocked relation with the tap changer it is not only possible to close switches $K_1$ and $K_2$ under no current condition but also can transfer the current flowing through the switches $K_3$ and $K_4$ to switches $K_1$ and $K_2$ without the necessity of utilizing current interrupting ability of the controlled rectifier elements 22 and 23 thus enabling to utilize selector switches $K_3$ and $K_4$ having no current interrupting ability.

Finally various current wave forms in the voltage regulating device of this invention FIG. 4 will be considered by referring to FIG. 4. It should be understood that the curves were plotted under the assumption that the main drive motor M does not induce any counter electromotive force. Accordingly although current waves shown in FIGS. 4c and 4d are plotted to have maximum values twice as large as those of the curves shown in FIGS. 4a and 4b it should be understood that the maximum value of currents shown in FIGS. 4c and 4d is substantially the same as that of the current shown in FIGS. 4a and 4b because, in actual operation, the motor M induces a counter electromotive force proportional to its speed. It is to be remembered that curves such as shown in FIGS. 4c and 4d were employed to simplify the description regarding controlled rectifier elements.

While above description refers to a particularly application of this invention to the speed control of an electric motor adapted to drive an alternating current electric car it is obvious that this invention provides a novel voltage regulating device which is economical, easy to maintain, can regulate linearly the voltage and can change the connection of transformer taps without accompanying any electric arc. Moreover the present voltage regulating device is advantageous in that is utilizes minimum number of controlled rectifier elements such as silicon controlled rectifier elements, grid controlled vapor electric discharge devices and the like and that the device can operate even when any one of the controlled rectifier elements fails its controlling ability.

In accordance with the provisions of the patent statutes, I have explained the principle and operation of my invention and have illustrated and described what I consider to represent the best embodiments thereof. However, I desire to have it understood that within the scope of the appended claims, the invention may be practiced otherwise than specifically illustrated and described.

What is claimed is:

1. Voltage regulating device comprising a transformer having a plurality of voltage regulating taps, a pair of bus bars, each connected to alternate ones of said taps, a D.C. load connected across output terminals of a rectifier means, at least two oppositely poled controlled rectifier elements connected between one end of said bus bars and the input terminal of said rectifier means, means to control the conduction of said controlled rectifier elements and means including tap selector switches and non-controlled rectifier elements connected in series therewith to interconnect the other end of said bus bars and said input terminals of said rectifier means.

2. A voltage regulating device comprising a transformer including a winding provided with a plurality of voltage regulating taps, a first group of switches each connected to the respective one of said taps, a pair of bus bars each connected to alternate switches of said first group, a rectifier bridge, a direct current load connected across the output terminals of said rectifier bridge, a second groups of switches, each switch of said second groups being connected to the respective one of said bus bars, a third group of switches with terminals on one side thereof connected to the respective one of said bus bars, while the opposite terminals connected together, means to connect one of the A.C. input terminals of said rectifier bridge to a terminal of said winding having the lowest voltage, the other of said A.C. input terminals being opened to provide independent arms each including a rectifier, means including at least two controlled rectifier elements to connect said independent arms to the common junction between said third group of switches, each of said controlled rectifier elements having the same polarity as the rectifier included in the associated bridge arm, means including a first group of non-controlled rectifiers to connect one of said arms to each one of said bus bars through said second group of switches, said first group of non-controlled rectifiers having the same polarity as the rectifier in one of said arms and means including a second group of non-controlled rectifiers to connect the other of said arms to each one of said bus bars through said second group of switches, said second group of non-controlled rectifiers having the same polarity as the rectifier in the other of said arms.

3. An arcless tap changing device, especially suitable for use in an electric car, comprising a source of alternating current, a transformer energized from said source and provided with a plurality of voltage regulating taps, a plurality of tap changing switches each connected to the respective one of said taps, a pair of bus bars each connected to alternate ones of said tap changing switches, a first pair of selector switches each connected to the respective one of said bus bars, a second pair of selector switches each connected on one side thereof to the respective one of said bus bars and interconnected on the opposite side, a D.C. load connected to said first pair of selector switches through a rectifying means, a pair of oppositely poled controlled rectifier elements connected between said second pair of selector switches and said rectifier means and means to control said controlled rectifier elements in an interlocked relation with the operations of said tap changing switches and of said first and second pairs of selector switches.

4. An arcless tap changing device comprising a source of alternating current, a transformer energized from said source of alternating current and provided with a plurality of voltage regulating taps, a plurality of tap changing switches each connected to the respective one of said taps, a pair of bus bars each connected to alternate one of said tap changing switches, a pair of selector switches each connected to the respective one of said bus bars, a second pair of selector switches, each connected on one side thereof to the respective one of said bus bars and interconnected on the opposite side, said second pair of selector switches having a load current interrupting ability, a D.C. load connected to said first pair of selector switches through a rectifier means, a pair of oppositely poled controlled rectifier elements connected between said rectifying means and said second pair of selector switches, whereby enabling said second pair of selector switches to interrupt load current should said controlled rectifier elements fail to interrupt said load current.

5. The tap changing device according to claim 3 or 4 wherein booster transformers are connected in circuit with said second pair of selector switches.

No references cited.

JOHN F. COUCH, *Primary Examiner.*

M. L. WACHTELL, *Assistant Examiner.*